(12) United States Patent  (10) Patent No.: US 7,821,575 B2
Yamada  (45) Date of Patent: Oct. 26, 2010

(54) IMAGE PROCESSING APPARATUS, RECEIVER, AND DISPLAY DEVICE

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/491,118

(22) Filed: Jun. 24, 2009

(65) Prior Publication Data

US 2010/0134684 A1 Jun. 3, 2010

(30) Foreign Application Priority Data

Nov. 28, 2008 (JP) ............... 2008-305210

(51) Int. Cl.
*H04N 5/44* (2006.01)
*H04N 5/445* (2006.01)
*H04N 9/74* (2006.01)

(52) U.S. Cl. .................. 348/553; 348/563; 348/600

(58) Field of Classification Search .............. 348/589, 348/553–555, 563–565, 598, 600, 725; 345/629, 345/634–636, 638; *H04N 5/44, 5/46, 5/445, H04N 5/45, 9/74, 9/76*
See application file for complete search history.

(56) References Cited

U.S. PATENT DOCUMENTS 6,266,042 B1  7/2001 Aratani
6,948,022 B2  9/2005 Ishibashi
7,643,095 B2 * 1/2010 Yoshii .................. 348/554
2007/0091120 A1 4/2007 Oura

FOREIGN PATENT DOCUMENTS

| JP | 06-197337 | 7/1994 |
| JP | 11-119722 | 4/1999 |
| JP | 2001-022335 | 1/2001 |
| JP | 2002-221952 | 8/2002 |
| JP | 2004-219759 | 8/2004 |
| JP | 2007-108447 | 4/2007 |
| JP | 2008-172399 | 7/2008 |
| WO | 02/060175 A1 | 8/2002 |

* cited by examiner

*Primary Examiner*—Sherrie Hsia
(74) *Attorney, Agent, or Firm*—Blakely, Sokoloff, Taylor & Zafman LLP

(57) ABSTRACT

According to one embodiment, an image processing apparatus includes a receiver, a display device, and a transmission module. The receiver includes a video receiver, a video processor, a graphics processor, and a multiprocessor. The video processor converts the video signal received by the video receiver to a moving image with a first resolution. The graphics processor outputs a still image with a second resolution higher than the first resolution according to an instruction. The multiprocessor divides the still image into divisional still images with the first resolution. The display device includes a display module, a scaling processor, a restoration processor, and a blend processor. The scaling processor scales the moving image with the first resolution. The restoration processor restores the divisional still images to the original still image. The blend processor displays the moving image and the still image with the second resolution on the display module.

4 Claims, 8 Drawing Sheets

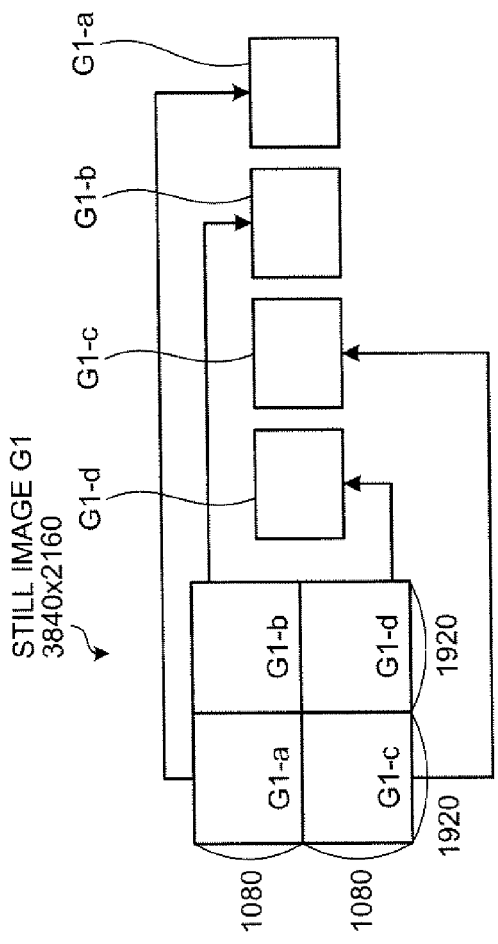
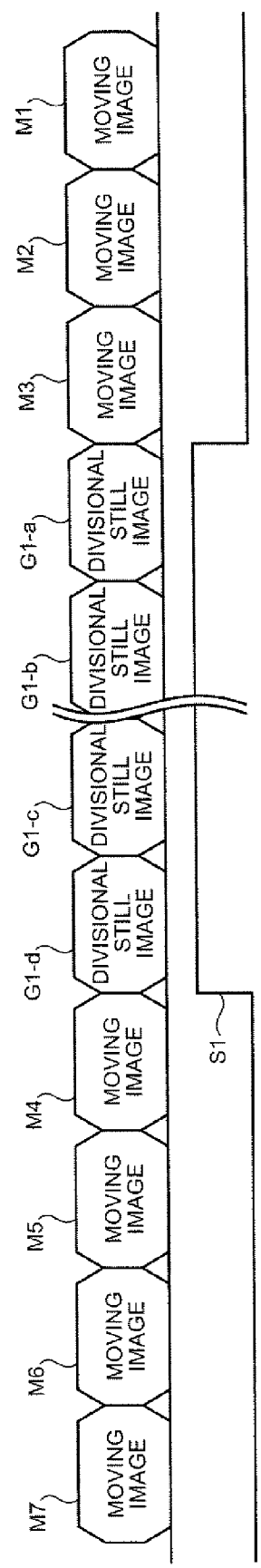

IMAGE PROCESSING APPARATUS, RECEIVER, AND DISPLAY DEVICE

CROSS-REFERENCE TO RELATED APPLICATIONS

This application is based upon and claims the benefit of priority from Japanese Patent Application No. 2008-305210, filed Nov. 28, 2008, the entire contents of which are incorporated herein by reference.

BACKGROUND

1. Field

One embodiment of the invention relates to an image processing technology, and more particularly, to an image processing apparatus, a receiver, and display device.

2. Description of the Related Art

In recent years, as the resolution of images has been increasing, the resolution of display panels such as liquid crystal display (LCD) panels has also been increasing. Thus, there are now display panels with a resolution of, for example, 3840×2160 pixels that is higher than full high definition (HD).

Japanese Patent Application Publication (KOKAI) No. H11-119722 discloses a conventional technology for enabling a still image with a high resolution of 2048×1536 pixels to be displayed on a display device even if the graphics card can render images of up to 1024×768 resolution. With the conventional technology, an input still image is once divided into four still images with a resolution of 1024×768 pixels. After that, the still images are combined together to be displayed on the display device. Thus, the high-resolution still image can be displayed on the display device.

When a moving image is displayed with a higher resolution than full HD, the moving image is generally expanded by scaling. Therefore, in the strict sense, it is not that the moving image is displayed with a higher resolution than full HD.

When, as in the case of a television receiver, a still image and a moving image received from the outside is displayed on an LCD panel or the like, scaling is performed on the still image as well as the moving image. For example, if a receiver that receives images such as a still image and a moving image from the outside is configured to be separated from a display device such as an LCD panel that displays the still image and the moving image received by the receiver, as, for example, a set-top box and an LCD panel, these devices are connected by a cable compatible with high-definition multimedia interface (HDMI). Thus, the receiver transmits the still image with the same resolution as the moving image to the display device. Then, the images are displayed on the display device after scaling is performed on them.

Differently from a moving image, with regard to a still image such as an electronic program guide (EPG), the receiver can generate still images of various resolutions. That is, in a physical sense, it is possible to generate a still image with a higher resolution than full HD.

With the cable compatible with HDMI, however, the maximum resolution of an image that can be transmitted is full HD. Consequently, a still image with a higher resolution than full HD cannot be transmitted as it is. As a result, a still image with a resolution of up to full HD can only be displayed in practice.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary schematic diagram for explaining the case where a multicircuit divides a still image in the first embodiment;

FIG. 4 is an exemplary schematic diagram for explaining the case where the multicircuit outputs a moving image frame by frame and divisional still images in the first embodiment;

DETAILED DESCRIPTION

Figure 1:
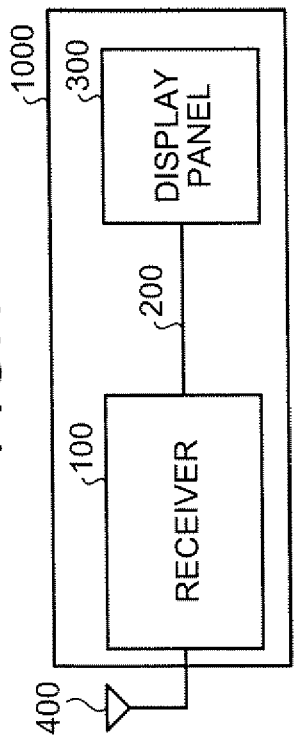
FIG. 1 is an exemplary block diagram of a broadcast receiver according to a first embodiment of the invention.

Various embodiments according to the invention will be described hereinafter with reference to the accompanying drawings. In general, according to one embodiment of the invention, an image processing apparatus comprises: a receiver configured to output a still image and a moving image with a first resolution; a display device configured to be capable of displaying the still image and the moving image with a second resolution that is higher than the first resolution; and a transmission module configured to transmit the still image and the moving image with the first resolution between the receiver and the display device. The receiver comprises: a video receiver configured to receive a video signal from outside; a video processor configured to convert the video signal to a moving image with the first resolution and output the moving image; a storage module to store positional information indicating a position to display a still image with the second resolution on the moving image displayed on the display device; a graphics processor configured to output the still image with the second resolution in response to an instruction from outside, and output the positional information stored in the storage module; and a multiprocessor configured to divide the still image with the second resolution to generate divisional still images with the first resolution, output the generated divisional still images and the moving image with the first resolution frame by frame, obtain divisional image positional information indicating a position to display each of the divisional still images on the moving image to be displayed on the display device based on the positional information, and output the divisional image positional information. The display device comprises: a display module configured to display the moving image and an superimposed image of the moving image and the still image with the second resolution; a scaling processor configured to convert the first resolution of the moving image to the second resolution; a video storage module configured to store a previous frame moving image in a video storage module, the previous frame moving image being a frame of the moving image with the second resolution output from the scaling processor; a restoration processor configured to obtain the positional information based on the divisional image positional information, and restore the divisional still images to the still image with the second resolution based on the divisional image positional information; a blend processor configured to control the displaying by the display module; and a switching module configured to switch the frame of the moving image input to the blend processor. The multiprocessor is configured to output an identification signal indicating that the divisional still images are output. The scaling processor is configured to convert, when determining that the identification signal is not output from the multiprocessor, the first resolution of the moving image to the second resolution. The restoration processor is configured to restore, when determining that the identification signal is output from the multiprocessor, the divisional still images to the still image with the second resolution. The switching module is configured to input, when determining that the identification signal is output from the multiprocessor, the previous frame moving image stored in the video storage module to the blend processor, and input, when determining that the identification signal is not output to the multiprocessor, the moving image with the second resolution output from the scaling processor to the blend processor. The blend processor is configured to display, when determining that the identification signal is output from the multiprocessor, the superimposed image in which the restored still image with the second resolution and the previous frame moving image are superimposed based on the positional information by the display module, and display, when determining that the identification signal is not output from the multiprocessor, the moving image with the second resolution output from the scaling processor by the display module.

According to another embodiment of the invention, an image processing apparatus comprises: a receiver configured to output a still image and a moving image with a first resolution; a display device configured to be capable of displaying the still image and the moving image with a second resolution that is higher than the first resolution that is higher than the first resolution; and a transmission module configured to transmit the still image and the moving image with the first resolution between the receiver and the display device. The receiver comprises a video receiver configured to receive a video signal from outside, a video processor configured to convert the video signal to a moving image with the first resolution and output the moving image, a graphics processor configured to output the still image with the second resolution in response to an instruction from outside, and a multiprocessor configured to divide the still image with the second resolution to generate divisional still images with the first resolution, output the generated divisional still images and the moving image with the first resolution frame by frame. The display device comprises a display module configured to display the moving image and the still image with the second resolution, a scaling processor configured to convert the first resolution of the moving image to the second resolution, a video memory to store a previous frame moving image where the previous frame moving image being a frame of the moving image with the second resolution output from the scaling processor, a restoration processor configured to restore the divisional still images to the still image with the second resolution, and the video processor is configured to specify a static moving image portion and output static moving image portion information indicating a range of the static moving image portion, the static moving image portion being a static portion of the moving image with the first resolution. The graphics processor is configured to specify an update still image portion, and output the update still image portion and update still image portion information indicating a range of the update still image portion, the update still image portion being a portion updated in the still image with the second resolution. The multiprocessor is configured to replace at least a portion of the static moving image portion of the frame of the moving image with the first resolution by the update still image portion to generate a composite moving image, and output the composite moving image, the static moving image portion information, and the update still image portion information. The scaling processor is configured to obtain, based on the static moving image portion information, a portion corresponding to the static moving image portion from the previous frame moving image, and replaces a region corresponding to the static moving image portion of a frame of the composite moving image with the converted second resolution by the portion corresponding to the static moving image portion obtained from the previous frame moving image to output a restored moving image. The restoration processor is configured to obtain the update still image portion from the composite moving image based on the update still image portion information, and replaces an area corresponding to the update still image portion of the restored still image with the second resolution by the update still image portion obtained from the composite moving image to generate a restored still image.

FIG. 1 is a block diagram of a broadcast receiver 1000 as an image processing apparatus according to a first embodiment of the invention. As illustrated in FIG. 1, the broadcast receiver 1000 comprises a receiver 100, a transmission cable 200, a display panel 300, and an antenna 400. While the image processing apparatus is described herein by way of example as a broadcast receiver, it may be any other device having the same function as the broadcast receiver.

The receiver 100 receives via the antenna 400 broadcast video (a moving image) as well as generating graphics (a still image). The transmission cable 200 is used to transmit the still image and the moving image between the receiver 100 and the display panel 300. The display panel 300 displays the still image and the moving image transmitted thereto. The antenna 400 receives radio waves from the outside.

Figure 2:
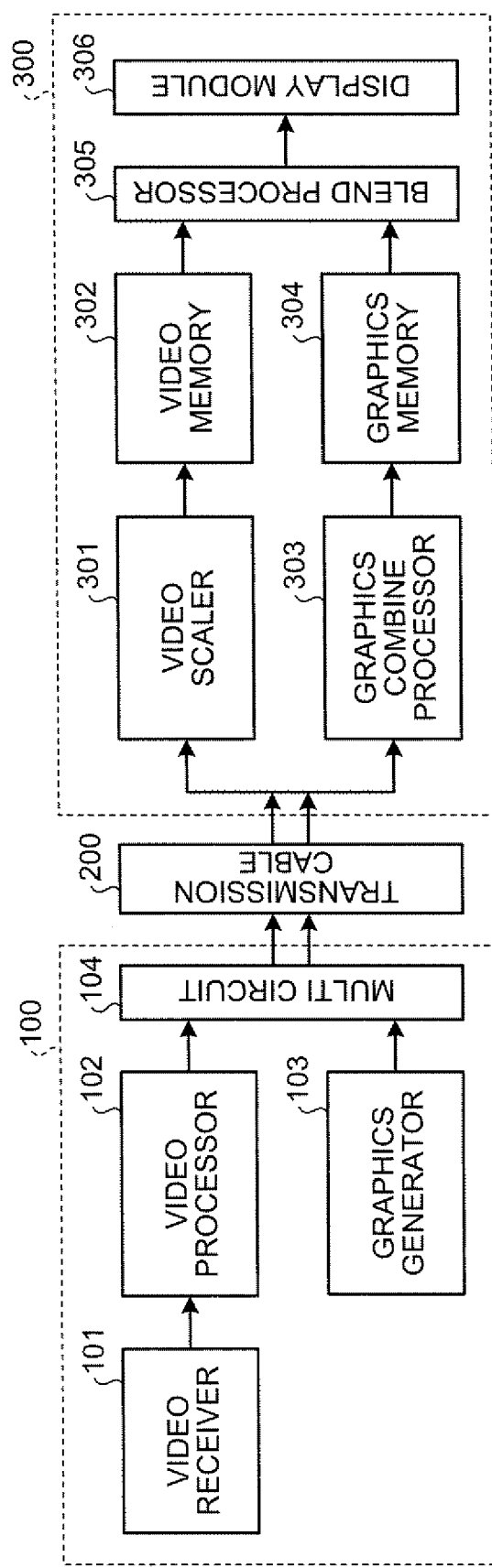
FIG. 2 is an exemplary functional block diagram of a receiver, a transmission cable, and a display panel illustrated in FIG. 1 in the first embodiment.

FIG. 2 is a functional block diagram of the receiver 100, the transmission cable 200, and the display panel 300. First, the receiver 100 will be described.

As illustrated in FIG. 2, the receiver 100 comprises a video receiver 101, a video processor 102, a graphics generator 103, and a multicircuit 104.

The video receiver 101 converts a radio wave received by the antenna 400 to a broadcast signal, and decodes the broadcast signal. The video receiver 101 then outputs the decoded broadcast signal to the video processor 102. The broadcast signal to which a radio wave is converted by the video receiver 101 includes a video signal indicating video data (a moving image) and program information such as the broadcast time of the moving image and a brief description of program content.

The video processor 102 performs conversion such as progressive scan conversion on the broadcast signal decoded by the video receiver 101. Thus, the video processor 102 outputs video data (a moving image) with a full HD resolution of 1920×1080 pixels to the multicircuit 104, which will be described later.

Upon receipt of a request from an external remote controller (not illustrated) or the like to display a still image on the display panel 300, the graphics generator 103 reads the program information form the broadcast signal to which a radio wave is converted by the video receiver 101. The graphics generator 103 then generates graphics (a still image) such as an electronic program guide (EPG), and outputs the still image thus generated to the multicircuit 104, which will be described later. It is assumed herein that the still image generated by the graphics generator 103 has a resolution of 3840× 2160 pixels.

Having received the moving image output from the video processor 102, the multicircuit 104 outputs the moving image frame by frame to the transmission cable 200. Meanwhile, having received the still image generated by the graphics generator 103, the multicircuit 104 divides the still image into images with a resolution (for example, images with a resolution of 1920×1080 pixels) that can be transmitted over the transmission cable 200. Then, the multicircuit 104 outputs the divisional still images to the transmission cable 200.

FIG. 3 is a schematic diagram for explaining the operation of the multicircuit 104 to divide a still image. As illustrated in FIG. 4, the multicircuit 104 divides a still image G1 with a resolution of 3840×2160 pixels generated by the graphics generator 103 into four still images G1-*a* to G1-*d* with a resolution of 1920×1080 pixels. The multicircuit 104 then sequentially outputs the divisional still images G1-*a* to G1-*d* to the transmission cable 200.

In this manner, the multicircuit 104 outputs the moving image received from the video processor 102 frame by frame without dividing it. On the other hand, the multicircuit 104 divides the still image generated by the graphics generator 103 into images with a resolution that can be transmitted over the transmission cable 200, and outputs the divisional still images to the transmission cable 200.

FIG. 4 is a schematic diagram for explaining the case where the multicircuit 104 outputs a moving image and a still image. As illustrated in FIG. 4, the multicircuit 104 sequentially outputs frames of moving images M1 to M3, and thereafter, sequentially outputs the divisional still images G1-*a* to G1-*d*. FIG. 4 illustrates the case, for example, where while a user is viewing a moving image, he/she switches the moving image to the still image G1 to view when the frame of the moving image M3 has been transmitted, and then views the moving image (frames of moving images M4 to M7) again.

When outputting a divisional still image, the multicircuit 104 also outputs an identification signal S1 indicating that an output image is a still image. In other words, when outputting a moving image, the multicircuit 104 outputs only the moving image, while when outputting a still image, the multicircuit 104 outputs the still image together with the identification signal S1. In the example of FIG. 4, after outputting the divisional still image G1-*d* and the identification signal S1, the multicircuit 104 outputs the moving images M4 to M7. Referring back to FIG. 2, the transmission cable 200 will be described.

The transmission cable is a cable defined by the high-definition multimedia interface (HDMI) standard, and is used to transmit a still image and a moving image with a full HD resolution of 1920×1080 pixels, the identification signal S1, and the like. Next, the display panel 300 will be described.

As illustrated in FIG. 2, the display panel 300 comprises a video scaler 301, a video memory 302, a graphics combine processor 303, a graphics memory 304, a blend processor 305, and a display module 306.

The video scaler 301 determines the presence or absence of the identification signal S1, thereby determining whether a still image or a moving image frame has been transmitted. When determining that the identification signal S1 has not been transmitted, i.e., a moving image frame has been transmitted, the video scaler 301 performs scaling on the moving image frame to expand the moving image.

Figure 5:
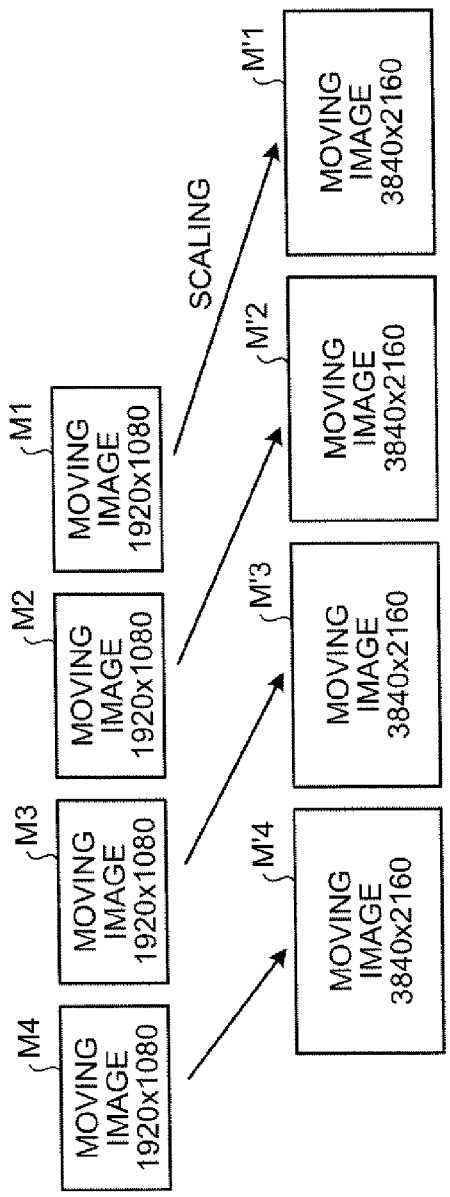
FIG. 5 is an exemplary schematic diagram for explaining the case where a video scaler performs scaling on a moving image in the first embodiment.

FIG. 5 is a schematic diagram for explaining the operation of the video scaler 301 to perform scaling on a moving image. As illustrated in FIG. 5, upon receipt of the moving images M1 to M4 with a resolution of 1920×1080 pixels frame by frame from the transmission cable 200, the video scaler 301 sequentially scales them to moving images M'1 to M'4 with a resolution of 3840×2160 pixels. The video scaler 301 then outputs the moving images M'1 to M'4 to the video memory 302, which will be described later.

The video memory 302 stores the moving images M'1 to M'4 scaled and output by the video scaler 301.

As with the video scaler 301, the graphics combine processor 303 determines the presence or absence of the identification signal S1, thereby determining whether a still image or a moving image frame has been transmitted. When determining that the identification signal S1 has been transmitted, i.e., a still image has been transmitted, the graphics combine processor 303 combines divisional still images in the order in which the graphics combine processor 303 receives them (in the example of FIG. 4, in the order of the divisional still images G1-*a* to G1-*d*). Thus, the graphics combine processor 303 restores the original still image G1. The graphics combine processor 303 outputs the restored still image G1 to the graphics memory 304 together with the identification signal S1.

In the first embodiment, each of the video scaler 301 and the graphics combine processor 303 determines whether the identification signal S1 has been transmitted. However, this is by way of example only and, for example, there may be provided a detector that detects the identification signal S1. In this case, the video scaler 301 and the graphics combine processor 303 require less processing load. In addition, since one module determines the presence or absence of the identification signal S1, it is possible to more efficiently perform scaling as well as to combine divisional images.

Referring back to FIG. 2, the graphics memory 304 stores the still image (G1) with a resolution of 3840×2160 pixels restored by the graphics combine processor 303 with the identification signal S1.

The blend processor 305 determines whether the graphics memory 304 stores the identification signal S1. Having determined that the graphics memory 304 stores the identification signal S1, the blend processor 305 reads the still image stored in the graphics memory 304, and outputs it to the display module 306.

On the other hand, having determined that the graphics memory 304 does not store the identification signal S1, the blend processor 305 reads the moving image stored in the video memory 302, and outputs it to the display module 306.

As described above, according to the first embodiment, the video receiver 101 of the receiver 100 receives a video signal from the outside. The video processor 102 converts the video signal into a moving image with a full HD resolution, and outputs the moving image. According to an instruction from the outside, the graphics generator 103 outputs a still image with a higher resolution than full HD. The multicircuit 104 divides the still image with a higher resolution than full HD into divisional still images with a full HD resolution. The divisional still images are sequentially output, while the moving image with a full HD resolution is output frame by frame. The video scaler 301 performs scaling on the moving image with a full HD resolution. The graphics combine processor 303 restores the divisional still images to the original still image with a higher resolution than full HD. The blend processor 305 displays the moving image with a full HD resolution scaled by the video scaler 301 and the restored still image with a higher resolution than full HD on the display module 306. Thus, if a still image is transmitted together with a moving image, the still image can be displayed with a higher resolution than full HD.

In the first embodiment described above, when images displayed on the display panel 300 is switched between a still image and a moving image, the still image is divided into images with a resolution that can be transmitted. Thus, even if the still image has a resolution higher than full HD, the still image can be displayed with the resolution. However, there is a case where a still image is displayed such that it is superimposed on part of a moving image as on screen display (OSD). According to a second embodiment of the invention, a moving image and a still image are displayed in a superimposed manner while the moving image, which is displayed together with the still image, is being properly controlled.

Figure 6:
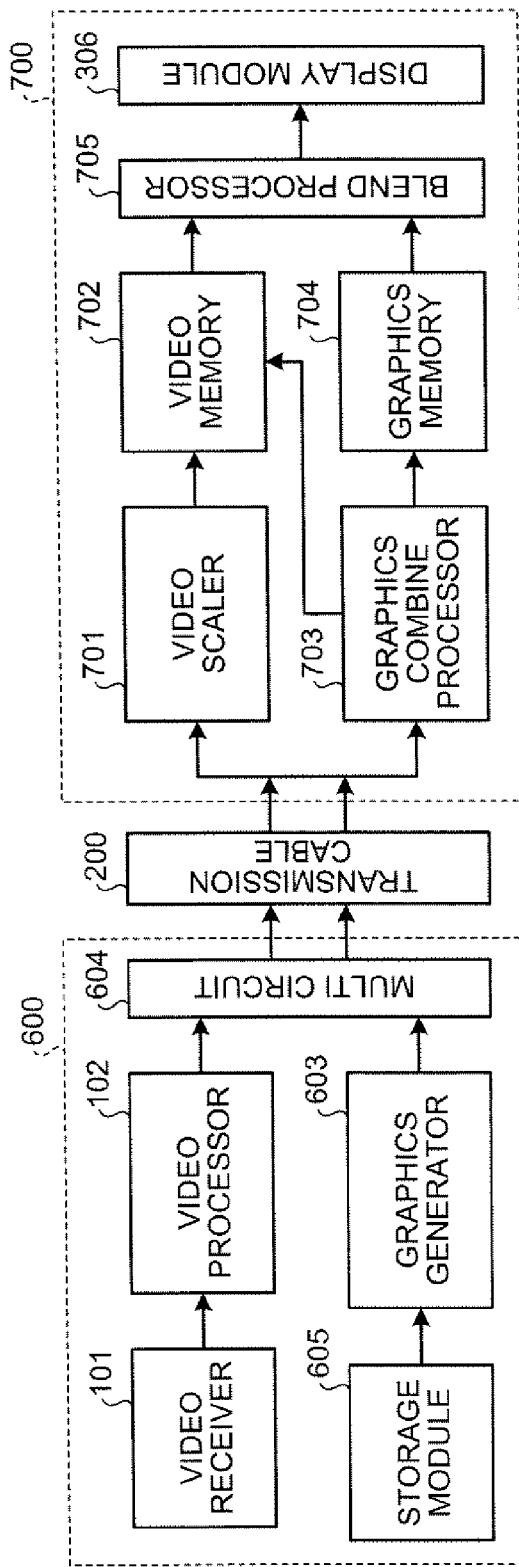
FIG. 6 is an exemplary functional block diagram of a receiver and a display panel according to a second embodiment of the invention.

FIG. 6 is a functional block diagram of a receiver 600 and a display panel 700 according to the second embodiment. Differently from the receiver 100 of the first embodiment, the receiver 600 of the second embodiment comprises a graphics generator 603 and a multicircuit 604 in place of the graphics generator 103 and the multicircuit 104 of the first embodiment. Besides, the receiver 600 further comprises a storage module 605.

Meanwhile, differently from the display panel 300 of the first embodiment, the display panel 700 of the second embodiment comprises a video scaler 701, a video memory 702, a graphics combine processor 703, a graphics memory 704, and a blend processor 705 in place of the video scaler 301, the video memory 302, the graphics combine processor 303, the graphics memory 304, and the blend processor 305 of the first embodiment. Constituent elements corresponding to those of the first embodiment are designated by the same reference numerals, and their description will not be repeated.

The graphics generator 603 performs the same processing as performed by the graphics generator 103 of the first embodiment. In addition, upon receipt of a request from an external remote controller (not illustrated) or the like to display a still image to be superimposed on a moving image while the moving image is being displayed, the graphics generator 603 reads positional information to display the still image on the moving image from the storage module 605, which will be described later. The positional information may indicate the position of the still image with respect to the whole moving image frame. For example, if the still image is rectangular in shape, the positional information may indicate the coordinates of each corner of the rectangular still image. The graphics generator 603 then outputs the generated still image and the positional information to the multicircuit 104.

The multicircuit 604 performs the same processing as performed by the multicircuit 104 of the first embodiment. In addition, the multicircuit 604 obtains, based on the positional information received from the graphics generator 603, divisional image positional information indicating the position of each divisional still image. For example, when a rectangular still image is divided into four divisional still images, the multicircuit 604 obtains the coordinates of each corner of each of the four divisional still images, and outputs the coordinates thus obtained.

At this point, the multicircuit 604 outputs the divisional image positional information before outputting the divisional still images. In other words, the multicircuit 604 outputs the divisional image positional information together with a moving image frame transmitted immediately before the still images. This is because, as will be described later, to allow the video scaler 701 to determine whether to output a moving image to a frame buffer 7021 upon outputting a previous frame moving image, which will be described later, to the video memory 702.

Figure 7:
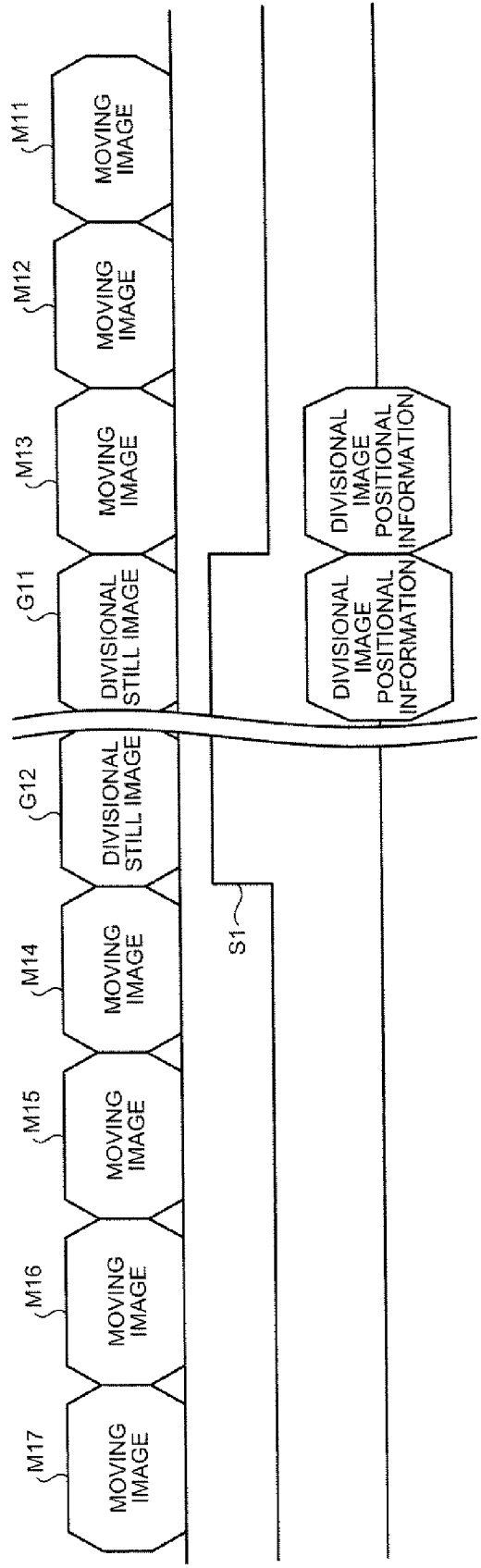
FIG. 7 is an exemplary schematic diagram for explaining the case where a multicircuit outputs divisional image positional information in addition to a still image and an identification signal in the second embodiment.
Figure 8:
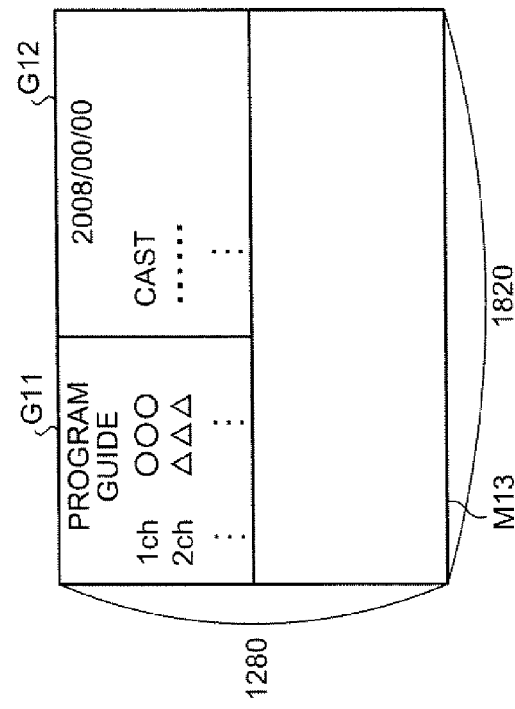
FIG. 8 is an exemplary schematic diagram of a still image that is superimposed on the upper (or lower) half of a moving image frame in the second embodiment.

FIG. 7 is a schematic diagram for explaining the case where the multicircuit 604 outputs divisional image positional information in addition to a still image and the identification signal S1. As illustrated in FIG. 7, the multicircuit 604 outputs divisional image positional information together with a previous frame moving image, which will be described later, before outputting a divisional still image and the identification signal S1. The multicircuit 604 operates in this manner when, for example, as illustrated in FIG. 8, still images G11 and G12 are displayed as being superimposed on the upper (or lower) half of a frame of a moving image M13 while a user is viewing the moving image (M11 to M17) so that the user can view both the moving image M13 and the still images G11 and G12.

The storage module 605 stores the positional information indicating a position to display a still image on a moving image. As described above, if the still image is rectangular in shape, the positional information may indicate, for example, the coordinates of each corner of the rectangular still image. The positional information is assumed to be determined in advance. Referring back to FIG. 6, the display panel 700 will be described.

The video scaler 701 of the display panel 700 performs the same processing as performed by the video scaler 301 of the first embodiment. In addition, according to whether the identification signal S1 has been transmitted, the video scaler 701 outputs the moving image on which scaling has been performed while switching the output destinations.

More specifically the video scaler 701 determines whether the divisional image positional information has been transmitted together with a moving image. When determining that the divisional image positional information has been transmitted, the video scaler 701 performs scaling on the moving image transmitted together with the divisional image positional information. The video scaler 701 then outputs the moving image to the frame buffer 7021 of the video memory 702, which will be described later. In the example of FIG. 7, the video scaler 701 outputs the moving image M13 transmitted together with the divisional image positional information to the frame buffer 7021. The moving image that has been transmitted together with the divisional image positional information and then subjected to scaling is herein referred to as "previous frame moving image".

The video memory 702 stores the same data as stored in the video memory 302 of the first embodiment. In addition, the video memory 702 controls the output of a moving image on which a still image is to be superimposed.

Figure 9:
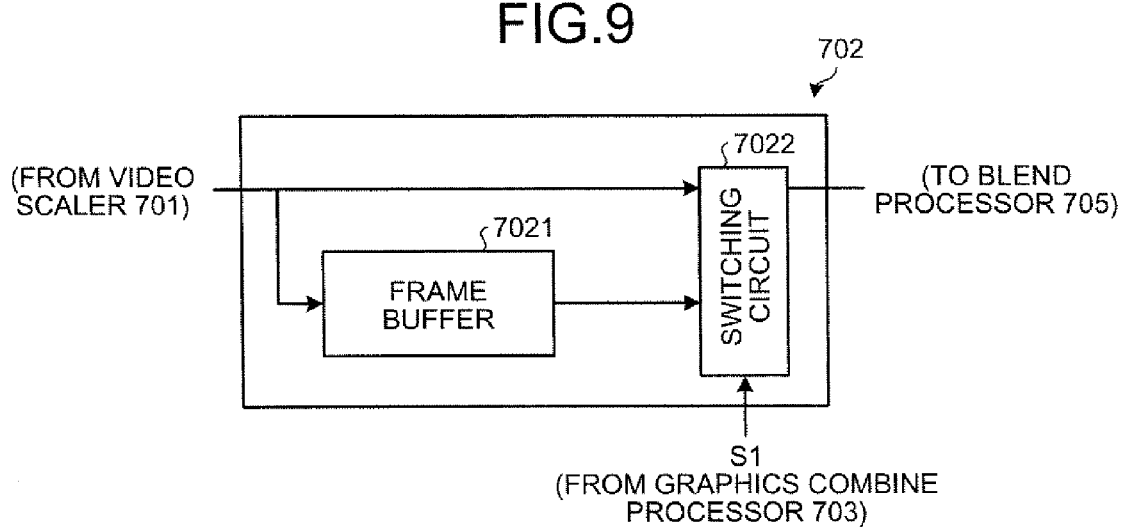
FIG. 9 is an exemplary block diagram of a physical configuration of a video memory illustrated in FIG. 6 in the second embodiment.

FIG. 9 is a block diagram of a physical configuration of the video memory 702. As illustrated in FIG. 7, the video memory 702 comprises the frame buffer 7021 and a switching circuit 7022.

When the video scaler 701 determines that divisional image positional information has been transmitted, the frame buffer 7021 stores a previous frame moving image.

Upon receipt of the identification signal S1 output from the graphics combine processor 703, as will be described later, the switching circuit 7022 reads the previous frame moving image from the frame buffer 7021. Then, the switching circuit 7022 outputs the previous frame moving image to the blend processor 705.

On the other hand, when not having received the identification signal S1 output from the graphics combine processor 703, the switching circuit 7022 outputs the moving image output from the video scaler 701 to the blend processor 705.

Referring back to FIG. 6, the graphics combine processor 703 performs the same processing as performed by the graphics combine processor 303 of the first embodiment. In addition, the graphics combine processor 703 determines whether divisional image positional information has been transmitted. When determining that divisional image positional information has been transmitted, the graphics combine processor 703 sequentially combines divisional still images base on the divisional image positional information to restore the original still image. The graphics combine processor 703 then outputs the restored still image to the graphics memory 704.

Further, the graphics combine processor 703 obtains positional information indicating a position to display the original still image on the moving image based on the divisional image positional information. The graphics combine processor 703 also outputs the positional information thus obtained to the graphics memory 704.

The graphics memory 704 stores the same data as stored in the graphics memory 304 of the first embodiment. In addition, the graphics memory 704 stores the positional information received from the graphics combine processor 703.

The blend processor 705 performs the same processing as performed by the blend processor 305 of the first embodiment. In addition, the blend processor 705 reads the positional information stored in the graphics memory 704 and generates an image (hereinafter, "superimposed image") in which the still image stored in the graphics memory 704 is superimposed on the previous frame moving image received from the video memory 702 at the position indicated by the positional information. Thus, the blend processor 705 outputs the superimposed image to the display module 306.

Figure 10:
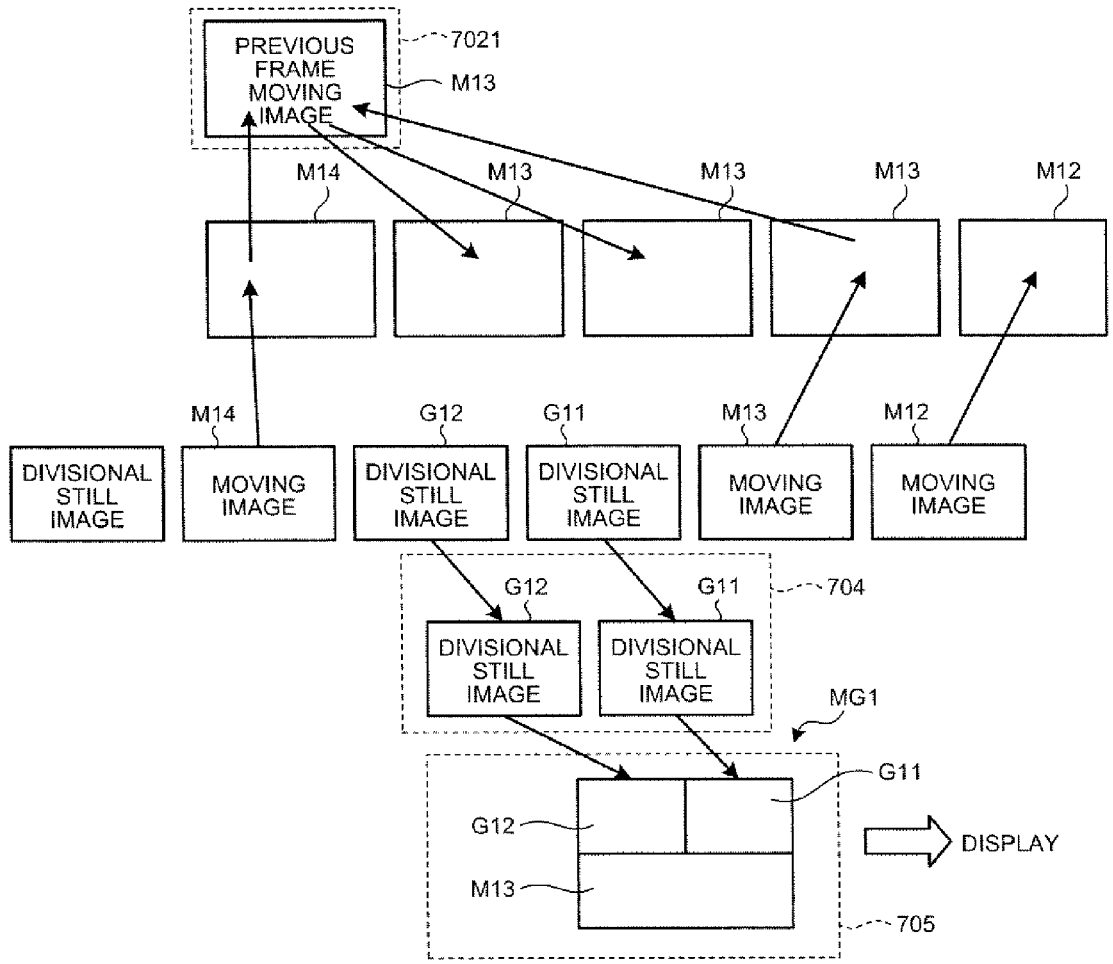
FIG. 10 is an exemplary schematic diagram for explaining the operation of a blend processor to display a moving image and a still image one on top of the other in the second embodiment.

FIG. 10 is a schematic diagram for explaining the operation of the blend processor 705. In the example of FIG. 10, the moving image M13 is illustrated as a previous frame moving image. First, upon receipt of the previous frame moving image M13 transmitted over the transmission cable 200, the video scaler 701 stores it in the frame buffer 7021.

After that, the graphics combine processor 703 reads divisional image positional information transmitted together with the previous frame moving image M13 (in the example of FIG. 10, divisional image positional information as to the still image G11). Thereafter, the graphics combine processor 703 reads the still image G11, the divisional image positional information as to the still image G12, and the still image G12 sequentially transmitted thereto, thereby restoring the original still image. Further, the graphics combine processor 703 obtains positional information indicating a position to display the original still image on the moving image. The graphics combine processor 703 stores the positional information thus obtained in the graphics memory 704 together with the original still image.

The blend processor 705 reads the previous frame moving image M13 stored in the frame buffer 7021. Further, the blend processor 705 reads the positional information stored in the graphics memory 704, and generates a superimposed image MG1 in which the original still image stored in the graphics memory 704 is superimposed on the previous frame moving image M13 based on the positional information. Thus, the blend processor 705 outputs the superimposed image MG1 to the display module 306.

While reading the still images G11 and G12 from the graphics memory 704, the blend processor 705 repeatedly reads the previous frame moving image M13 from the frame buffer 7021. Thus, the blend processor 705 generates the superimposed image MG1, and outputs it to the display module 306. Accordingly, the blend processor 705 generates the superimposed image MG1 and outputs it to the display module 306 the number of times divisional still images are transmitted, i.e., the number of times the identification signal S1 is transmitted. In the example of FIG. 10, the two still images G11 and G12 are transmitted, and therefore, the blend processor 705 generates the superimposed image MG1 and outputs it to the display module 306 twice.

As described above, according to the second embodiment, the storage module 605 stores positional information indicating a position to display a still image with a higher resolution than full HD on a moving image with a full HD resolution. The video memory 702 stores a previous frame moving image with a full HD resolution on which the still image with a higher resolution than full HD is to be superimposed. Upon receipt of an instruction from the outside to display the still image with a higher resolution than full HD to be superimposed on the moving image with a full HD resolution, the graphics generator 603 outputs the still image with a higher resolution than full HD and the positional information stored in the storage module 605. The multicircuit 604 obtains, based on the positional information, divisional image positional information indicating a position to display each of divisional still images on the moving image with a full HD resolution. The multicircuit 604 then outputs the divisional image positional information thus obtained and the divisional still images. Having received the divisional image positional information, the video scaler 701 outputs the moving image with a full HD resolution to the video memory 702. The graphics combine processor 703 combines the divisional still images base on the divisional image positional information to restore the original still image with a higher resolution than full HD. Further, the graphics combine processor 703 obtains positional information indicating a position to display the original still image based on the divisional image positional information. The graphics combine processor 703 then outputs the original still image with a higher resolution than full HD and the positional information thus obtained. The blend processor 705 generates a superimposed image in which the restored original still image with a higher resolution than full HD is superimposed on the previous frame moving image based on the positional information. The blend processor 705 then displays the superimposed image on the display module 306. Thus, if a still image is displayed in such a manner that it is superimposed on a moving image, the still image can be displayed with a higher resolution than full HD.

In the second embodiment described above, when an image in which a still image is superimposed on a moving image is displayed on the display panel 700, the next frame of the moving image is not displayed while the still image is being displayed. The still image and the moving image are displayed in a superimposed manner while the moving image, which is displayed together with the still image, is being properly controlled by displaying only the previous frame of the moving image. However, when the moving image appears static due to the display of the still image while being displayed, a user may feel that the moving image is less alive. According to a third embodiment of the invention, a moving image and a still image are displayed on a display panel in a superimposed manner using a static portion of the moving image.

Figure 11:
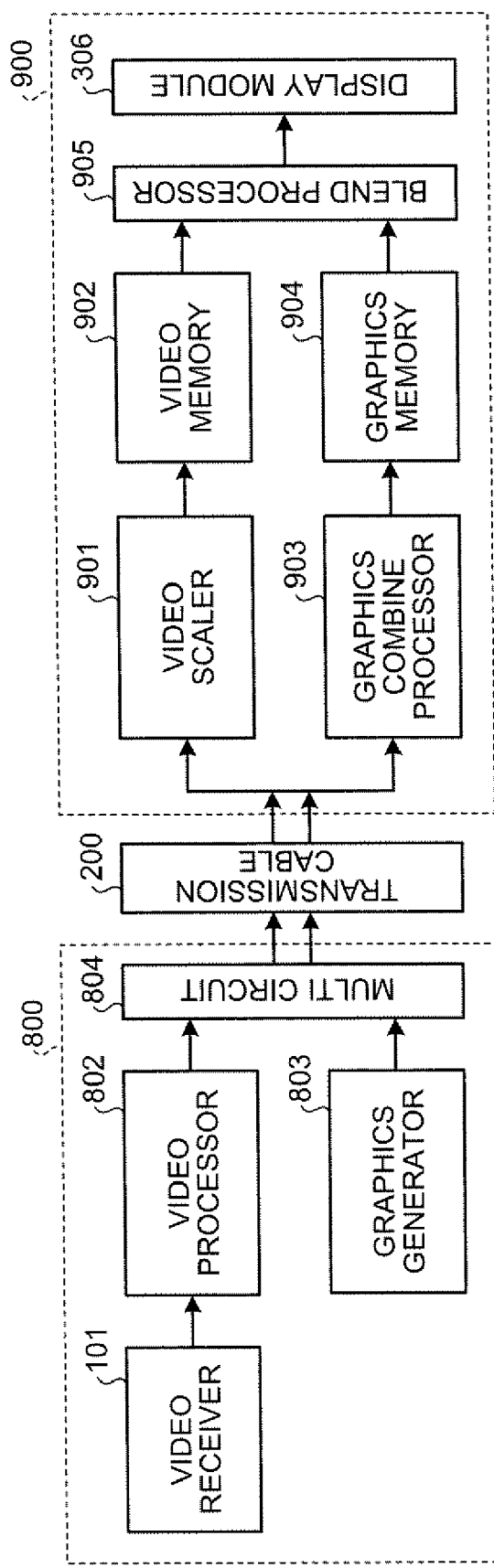
FIG. 11 is an exemplary functional block diagram of a receiver and a display panel according to a third embodiment of the invention.

FIG. 11 is a functional block diagram of a receiver 800 and a display panel 900 according to the third embodiment. Differently from the receiver 600 of the second embodiment, the receiver 800 of the third embodiment comprises a video processor 802, a graphics generator 803, and a multicircuit 804 in place of the video processor 102, the graphics generator 603, and the multicircuit 604 of the second embodiment.

Meanwhile, differently from the display panel 700 of the second embodiment, the display panel 900 of the third embodiment comprises a video scaler 901, a video memory 902, a graphics combine processor 903, a graphics memory 904, and a blend processor 905 in place of the video scaler 701, the video memory 702, the graphics combine processor 703, the graphics memory 704, and the blend processor 705 of the second embodiment. Constituent elements corresponding to those of the first embodiment are designated by the same reference numerals, and their description will not be repeated.

The video processor 802 performs the same processing as performed by the video processor 102 of the first embodiment. In addition, the video processor 802 specifies the range of a static portion of a moving image (hereinafter, "static moving image portion"), and outputs information indicating the range of the static moving image portion (hereinafter, "static moving image portion information"). The static moving image portion information may be the coordinates of the periphery of the range of a static moving image portion. For example, if the range of the static moving image portion is rectangular in shape, the static moving image portion information may indicate the coordinates of each corner of the rectangular range.

The graphics generator 803 performs the same processing as performed by the graphics generator 603 of the second embodiment. In addition, the graphics generator 803 determines whether the whole or part of a still image has been updated with a new image. When determining that the whole or part of a still image has been updated with a new image, the graphics generator 803 specifies the range of the updated portion (hereinafter, "update still image portion"). The graphics generator 803 then outputs information on the update still image portion and information indicating the range of the update still image portion (hereinafter, "update still image portion information"). The update still image portion information may be, as with the static moving image portion information, the coordinates of the periphery of the range of an update still image portion.

The multicircuit 804 performs the same processing as performed by the multicircuit 604 of the second embodiment. In addition, upon receipt of the static moving image portion information output from the video processor 802 and the update still image portion information output from the graphics generator 803, the multicircuit 804 compares the static moving image portion information and the update still image portion information. Then, the multicircuit 804 applies the update still image portion to the range of the static moving image portion, and outputs it to the transmission cable 200 together with the static moving image portion information and the update still image portion information.

A moving image in which an update still image portion of a still image is applied to a static moving image portion of the moving image in the manner as described above will be hereinafter referred to as "composite moving image". The multicircuit 804 outputs the composite moving image together with both the static moving image portion information and the update still image portion information because, as will be described later, the update still image portion does not always match the static moving image portion. This results in that a restored moving image and a restored still image, which will be described later, cannot be generated.

Incidentally, when a composite moving image is to be output, there may be a case where the range of an update still image portion exceeds the range of a static moving image portion. As a result, the moving image to be output to the transmission cable 200 may have a resolution higher than a resolution of 1920×1080 pixels that can be transmitted over the transmission cable 200.

In such a case, upon applying an update still image portion to the range of a static moving image portion, the multicircuit 804 may compare the ranges of these portions, and apply the update still image portion to the range of the static moving image portion only when determining that the range of the update still image portion is smaller than that of the static moving image portion.

Besides, the multicircuit 804 may output a composite moving image in several batches. More specifically, in this case, the multicircuit 804 compares the ranges of a static moving image portion and an update still image portion. When determining that the range of the update still image portion is larger than that of the static moving image portion, the multicircuit 804 counts the number of pixels in the range of the update still image portion. The multicircuit 804 then divides the update still image portion into a plurality of frames of still images such that the number of the pixels is less than a resolution of 1920×1080 pixels that can be transmitted over the transmission cable 200. After that, the multicircuit 804 applies one of the divisional update still image portions to the static moving image portion, and outputs a composite moving image. Similarly, the multicircuit 804 applies remaining divisional update still image portions to other frames of moving images, respectively, and outputs composite moving images.

Figure 12:
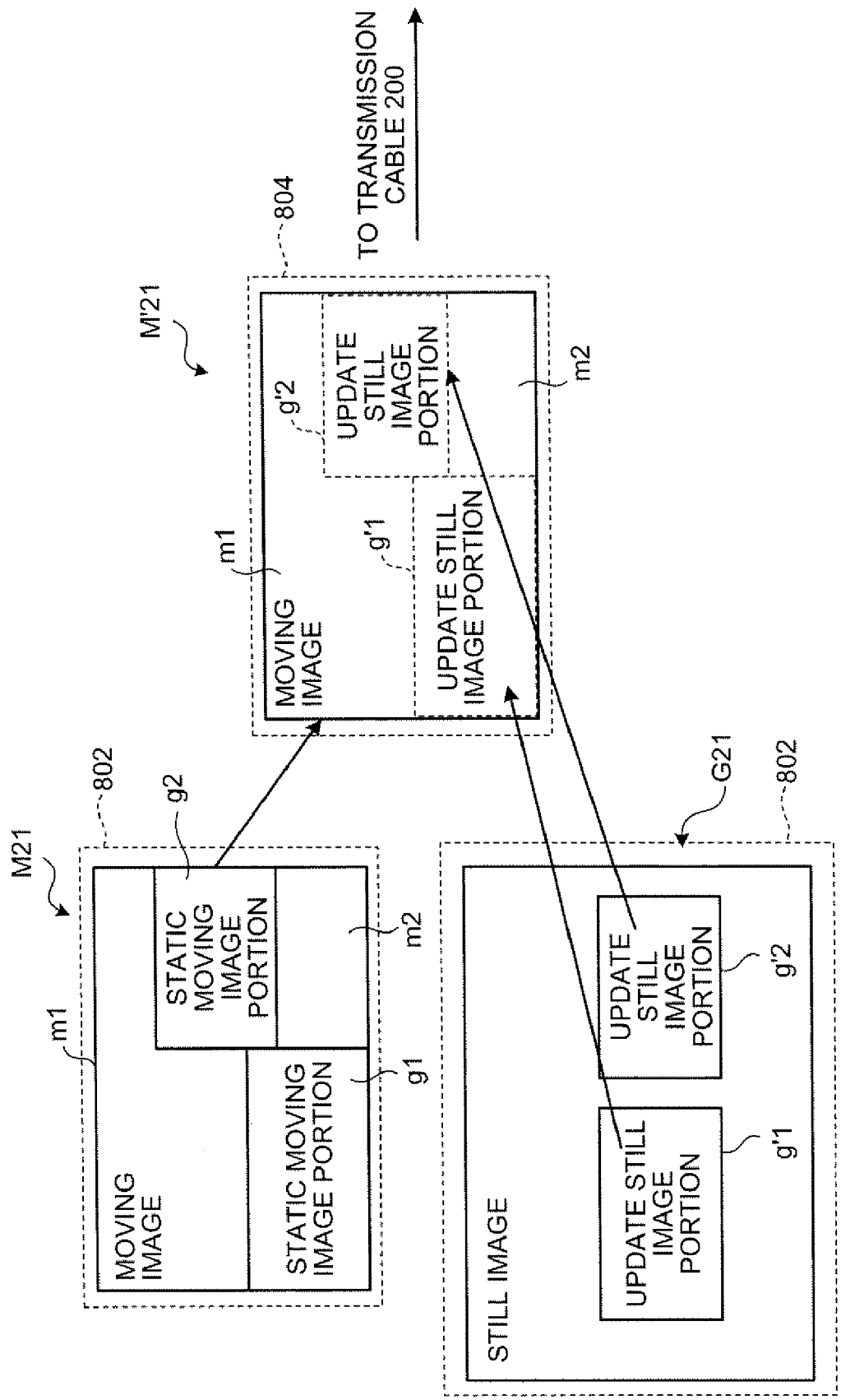
FIG. 12 is an exemplary schematic diagram for explaining the process of outputting a composite moving image in which static moving image portions are replaced with update still image portions in the third embodiment.

FIG. 12 is an exemplary schematic diagram for explaining the case where the video processor 802 specifies a static moving image portion, the graphics generator 803 specifies an update still image portion, and then the multicircuit 804 outputs a composite moving image to the transmission cable 200.

As illustrated in FIG. 12, first, the video processor 802 specifies static moving image portions g1 and g2 in a moving image M21 on which conversion such as progressive scan conversion has been performed. The video processor 802 then outputs the moving image M21 including the static moving image portions g1 and g2 and static moving image portion information as to the static moving image portions g1 and g2 to the multicircuit 804.

The video processor 802 may specify a static moving image portion in various manners. For example, the video processor 802 may compare the pixel values of pixels located at the same position in frames of moving images adjacent to the moving image M21. When the pixel values match, the video processor 802 may specify the position as a static moving image portion.

Meanwhile, the graphics generator 803 specifies update still image portions g'1 and g'2 in a still image G21. The graphics generator 803 then outputs the update still image portions g'1 and g'2 and update still image portion information as to them to the multicircuit 804. The graphics generator 803 may specify an update still image portion in various manners. For example, the graphics generator 803 may specify an update still image portion in the same manner as described above to specify a static moving image portion.

The multicircuit 804 applies the update still image portions g'1 and g'2 received from the graphics generator 803 to the moving image M21 received from the video processor 802 to generate a composite moving image M'21. The multicircuit 804 then outputs the composite moving image M'21. Referring back to FIG. 11, the video scaler 901 will be described.

The video scaler 901 performs the same processing as performed by the video scaler 701 of the second embodiment. In addition, the video scaler 901 applies a previous frame moving image to a portion except for an update still image portion in a composite moving image transmitted over the transmission cable 200, thereby generating a moving image (hereinafter, "restored moving image"). The video scaler 901 then outputs the restored moving image thus generated and static moving image portion information to the video memory 902.

More specifically, upon receipt of a composite moving image and static moving image portion information from the transmission cable 200, the video scaler 901 extracts a portion except for an update still image portion from the composite moving image. The video scaler 901 then extracts a static moving image portion at a position corresponding to that indicated by the static moving image portion information transmitted over the transmission cable 200 from a moving image stored in the frame buffer 7021. After that, the video scaler 901 applies the extracted static moving image portion to the portion except for the update still image portion to generate a restored moving image, and outputs it to the video memory 902.

The video memory 902 stores the same data as stored in the video memory 702 of the second embodiment. In addition, the video memory 902 stores the restored moving image and the static moving image portion information output from the video scaler 901.

The graphics combine processor 903 performs the same processing as performed by the graphics combine processor 703 of the second embodiment. In addition, the graphics combine processor 903 reads the update still image portion information transmitted together with the composite moving image, and extracts an update still image portion from the composite moving image. The graphics combine processor 903 then overwrites or updates a portion of a still image stored in the graphics memory 904 (i.e., a still image before update) corresponding to the update still image portion with the extracted update still image portion, thereby generating a still image (hereinafter, "restored still image"). The graphics combine processor 903 outputs the restored still image thus generated to the graphics memory 904.

The graphics memory 904 stores the same data as stored in the graphics memory 704 of the second embodiment. In addition, the graphics memory 904 stores the restored still image and the update still image portion information output from the graphics combine processor 903.

The blend processor 905 performs the same processing as performed by the blend processor 705 of the second embodiment. In addition, the blend processor 905 reads the restored moving image from the video memory 902, and displays the restored moving image on the display panel 900. Further, the blend processor 905 reads the restored still image from the graphics memory 904, and displays the restored still image on the display panel 900.

Figure 13:
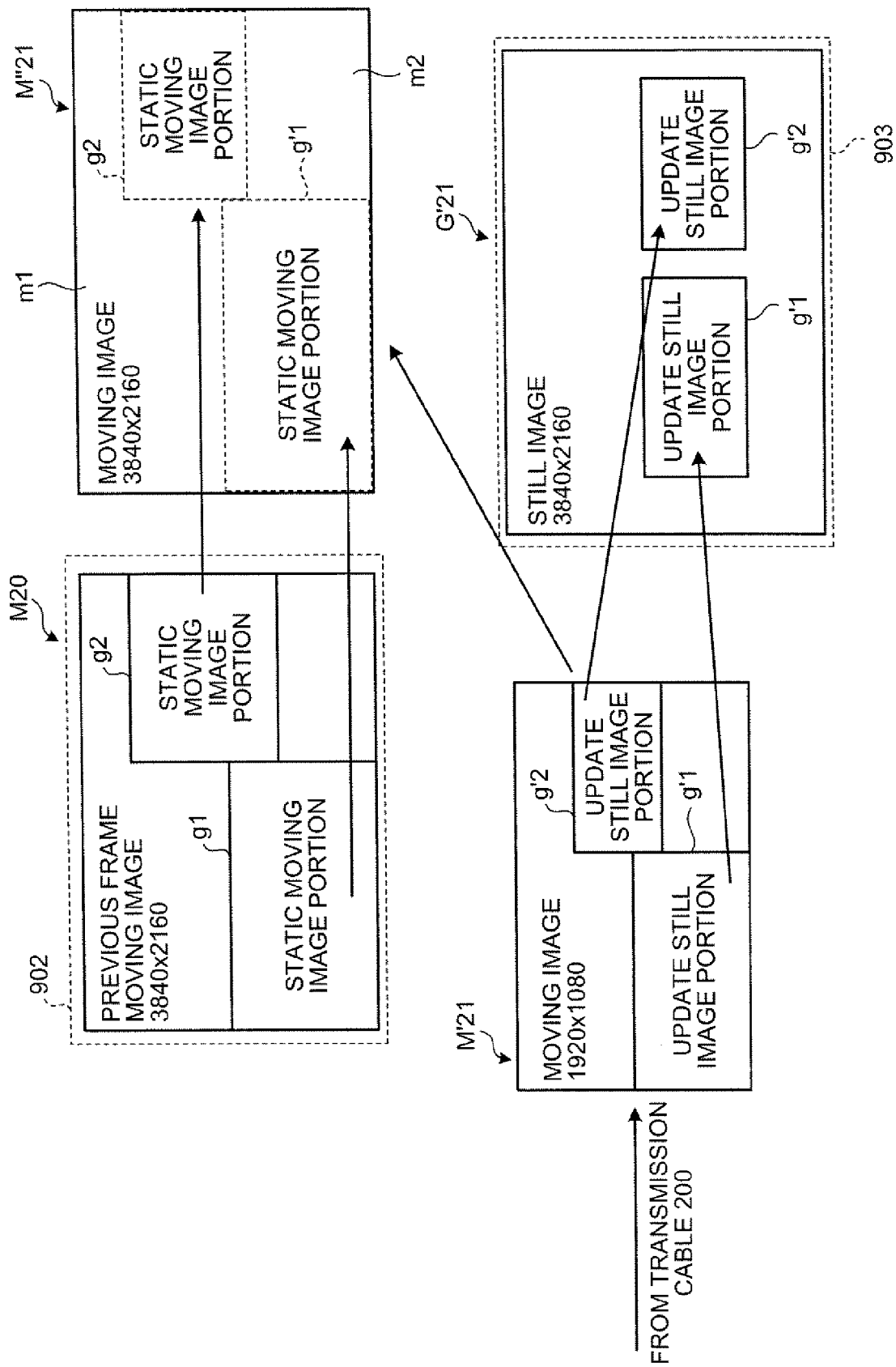
FIG. 13 is an exemplary schematic diagram for explaining the operation of a blend processor to display a restored moving image and a restored still image in the third embodiment.

FIG. 13 is an exemplary schematic diagram for explaining the process from the transmission of a composite moving image to the generation of a restored moving image and a restored still image.

As illustrated in FIG. 13, upon receipt of the composite moving image M'21 and static moving image portion information transmitted over the transmission cable 200, the video scaler 901 extracts moving image portions m1 and m2 except for the update still image portions g'1 and g'2 from the composite moving image M'21.

Thereafter, the video scaler 901 extracts the static moving image portions g1 and g2 corresponding to the update still image portions g'1 and g'2, respectively, from the previous frame moving image M20 stored in the frame buffer 7021 of the video memory 902. The video scaler 901 then applies the extracted static moving image portions g1 and g2 to the moving image portions m1 and m2 except for the update still image portions g'1 and g'2 in the composite moving image M'21, thereby generating a restored moving image M"21. The video scaler 901 outputs the restored moving image M"21 to the video memory 902.

On the other hand, upon receipt of the composite moving image M'21 and the update still image portion information transmitted over the transmission cable 200, the graphics combine processor 903 extracts the update still image portions g'1 and g'2 from the composite moving image M'21.

Thereafter, the graphics combine processor 903 applies the extracted update still image portions g'1 and g'2 to portions of a still image stored in the graphics memory 904 corresponding to the update still image portions g'1 and g'2, thereby generating a restored still image G'21. The graphics combine processor 903 then outputs the restored still image G'21 to the graphics memory 904. The blend processor 905 displays the restored moving image M"21 and the restored still image G'21 on the display panel 900.

As described above, according to the third embodiment, the video processor 802 specifies a static moving image portion, which is a static portion of a moving image converted to have a full HD resolution, and outputs static moving image portion information indicating the range of the static moving image portion. The graphics generator 803 specifies an update still image portion, which is a portion updated in a still image with a higher resolution than full HD, and outputs the update still image portion and update still image portion information indicating the range of the update still image portion. The multicircuit 804 applies the update still image portion to the static moving image portion of the moving image with a full HD resolution, thereby generating a composite moving image, and outputs the composite moving image, the static moving image portion information, and the update still image portion information. The video scaler 901 applies a static moving image portion of a previous frame moving image to a portion except for the update still image portion in the composite moving image to generate a restored moving image, and outputs the restored moving image. The graphics combine processor 903 reads the update still image portion information, and extracts the update still image portion from the composite moving image. The graphics combine processor 903 updates the restored still image with a higher resolution than full HD with the extracted update still image portion to generate a restored still image, and outputs the restored still image. The blend processor 905 displays the restored moving image and the restored still image on the display module 306. Thus, if a still image is displayed in such a manner that it is superimposed on a moving image, the still image can be displayed with a higher resolution than full HD without causing a user to feel that the moving image is less alive.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a receiver configured to output a still image and a moving image with a first resolution;
   a display device configured to be capable of displaying the still image and the moving image with a second resolution that is higher than the first resolution; and
   a transmission module configured to transmit the still image and the moving image with the first resolution between the receiver and the display device, wherein
   the receiver comprises
      a video receiver configured to receive a video signal from outside,
      a video processor configured to convert the video signal to a moving image with the first resolution and output the moving image,
      a storage module to store positional information indicating a position to display a still image with the second resolution on the moving image displayed on the display device;
      a graphics processor configured to output the still image with the second resolution in response to an instruction from outside, and output the positional information stored in the storage module, and
      a multiprocessor configured to divide the still image with the second resolution to generate divisional still images with the first resolution, output the generated divisional still images and the moving image with the first resolution frame by frame, obtain divisional image positional information indicating a position to display each of the divisional still images on the moving image to be displayed on the display device based on the positional information, and output the divisional image positional information,
   the display device comprises
      a display module configured to display the moving image and an superimposed image of the moving image and the still image with the second resolution,
      a scaling processor configured to convert the first resolution of the moving image to the second resolution,
      a video storage module to store a previous frame moving image, the previous frame moving image being a frame of the moving image with the second resolution output from the scaling processor,
      a restoration processor configured to obtain the positional information based on the divisional image positional information, and restore the divisional still images to the still image with the second resolution based on the divisional image positional information,
      a blend processor configured to control the displaying by the display module, and
      a switching module configured to switch the frame of the moving image input to the blend processor,
   the multiprocessor is configured to output an identification signal indicating that the divisional still images are output,
   the scaling processor is configured to convert, when determining that the identification signal is not output from the multiprocessor, the first resolution of the moving image to the second resolution,
   the restoration processor is configured to restore, when determining that the identification signal is output from the multiprocessor, the divisional still images to the still image with the second resolution,
   the switching module is configured to input, when determining that the identification signal is output from the multiprocessor, the previous frame moving image stored in the video storage module to the blend processor, and input, when determining that the identification signal is not output to the multiprocessor, the moving image with the second resolution output from the scaling processor to the blend processor, and
   the blend processor is configured to display, when determining that the identification signal is output from the multiprocessor, the superimposed image in which the restored still image with the second resolution and the previous frame moving image are superimposed based on the positional information by the display module, and display, when determining that the identification signal is not output from the multiprocessor, the moving image with the second resolution output from the scaling processor by the display module.

2. An image processing apparatus comprising:
   a receiver configured to output a still image and a moving image with a first resolution;
   a display device configured to be capable of displaying the still image and the moving image with a second resolution that is higher than the first resolution; and
   a transmission module configured to transmit the still image and the moving image with the first resolution between the receiver and the display device, wherein
   the receiver comprises
      a video receiver configured to receive a video signal from outside,
      a video processor configured to convert the video signal to a moving image with the first resolution and output the moving image,
      a graphics processor configured to output the still image with the second resolution in response to an instruction from outside, and
      a multiprocessor configured to divide the still image with the second resolution to generate divisional still images with the first resolution, output the generated divisional still images and the moving image with the first resolution frame by frame, the display device comprises
- a display module configured to display the moving image and the still image with the second resolution,
- a scaling processor configured to convert the first resolution of the moving image to the second resolution,
- a video storage module to store a previous frame moving image, the previous frame moving image being a frame of the moving image with the second resolution output from the scaling processor,
- a restoration processor configured to restore the divisional still images to the still image with the second resolution, and the video processor is configured to specify a static moving image portion and output static moving image portion information indicating a range of the static moving image portion, the static moving image portion being a static portion of the moving image with the first resolution, the graphics processor is configured to specify an update still image portion, and output the update still image portion and update still image portion information indicating a range of the update still image portion, the update still image portion being a portion updated in the still image with the second resolution, the multiprocessor is configured to replace at least a portion of the static moving image portion of the frame of the moving image with the first resolution by the update still image portion to generate a composite moving image, and output the composite moving image, the static moving image portion information, and the update still image portion information, the scaling processor is configured to obtain, based on the static moving image portion information, a portion corresponding to the static moving image portion from the previous frame moving image, and replaces a region corresponding to the static moving image portion of a frame of the composite moving image with the converted second resolution by the portion corresponding to the static moving image portion obtained from the previous frame moving image to output a restored moving image, and, the restoration processor is configured to obtain the update still image portion from the composite moving image based on the update still image portion information, and replaces an area corresponding to the update still image portion of the restored still image with the second resolution by-the update still image portion obtained from the composite moving image to generate a restored still image.

3. The image processing apparatus of claim 2, wherein the multiprocessor is configured to compare the range of the static moving image portion and the range of the update still image portion, and generate the composite moving image only when the update still image portion is smaller than the static moving image portion.

4. The image processing apparatus of claim 3, wherein the multiprocessor is configured to compare the range of the static moving image portion and the range of the update still image portion by comparing number of pixels in the static moving image portion and number of pixels in the update still image portion.

* * * * *